United States Patent
Akashi (10) Patent No.: US 9,311,577 B2
(45) Date of Patent: Apr. 12, 2016

(54) IMAGE FORMING APPARATUS FOR CHANGING SHEET INFORMATION ASSOCIATED WITH SHEET CASSETTE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Masamichi Akashi, Eindhoven (NL)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/906,991

(22) Filed: May 31, 2013

(65) Prior Publication Data

US 2013/0329254 A1 Dec. 12, 2013

(30) Foreign Application Priority Data

Jun. 8, 2012 (JP) ................................. 2012-130664

(51) Int. Cl.
*G06K 15/00* (2006.01)
*G03G 15/00* (2006.01)

(52) U.S. Cl.
CPC .......... *G06K 15/4065* (2013.01); *G03G 15/502* (2013.01); *G03G 2215/0089* (2013.01); *G06K 15/005* (2013.01)

(58) Field of Classification Search
USPC .......................................... 358/1.15; 399/81
See application file for complete search history.

(56) References Cited

U.S. PATENT DOCUMENTS

| | | | | |
|---|---|---|---|---|
| 2005/0270566 | A1* | 12/2005 | Tanaka | 358/1.15 |
| 2010/0046977 | A1* | 2/2010 | Inenaga et al. | 399/81 |
| 2011/0051187 | A1* | 3/2011 | Konuma | 358/1.15 |
| 2012/0212771 | A1* | 8/2012 | Goddard et al. | 358/1.15 |

FOREIGN PATENT DOCUMENTS

| | | |
|---|---|---|
| JP | 2000-238341 A | 9/2000 |
| JP | 2007-168383 A | 7/2007 |

OTHER PUBLICATIONS

Machine translation for JP 2000-238341, IDS.*
Machine translation for JP 2007-168383, IDS.*

* cited by examiner

*Primary Examiner* — Qian Yang
(74) *Attorney, Agent, or Firm* — Rossi, Kimms & McDowell LLP (57) ABSTRACT

An image forming apparatus that is capable of decreasing the stopping time during which the image forming apparatus stops and of increasing productivity. An image forming unit executes print jobs in order. An operation unit receives an instruction inputted by a user. A generation unit generates a setting job concerning a device setting based on a user's instruction inputted through the operation unit. A setting unit sets execution timing of the setting job generated by the generation unit based on a user's instruction inputted through the operation unit. A control unit stops an operation of the image forming unit and to execute the setting job generated by the generation unit at the execution timing set by the setting unit, and resumes the operation of the image forming unit after the setting job finishes.

6 Claims, 10 Drawing Sheets

- 301 GENERATE SETTING JOB
- 302 FIRST PRINT JOB
- 303 SECOND PRINT JOB
- 304 THIRD PRINT JOB
- 305 SCHEDULE
- 306 JOB

FIG.3B 310

- 301 GENERATE SETTING JOB
- 302 FIRST PRINT JOB
- 303 SECOND PRINT JOB
- 309 FEEDER SETTING JOB
- 304 THIRD PRINT JOB
- 305 SCHEDULE
- 306 JOB

IMAGE FORMING APPARATUS FOR CHANGING SHEET INFORMATION ASSOCIATED WITH SHEET CASSETTE, CONTROL METHOD THEREFOR, AND STORAGE MEDIUM STORING CONTROL PROGRAM THEREFOR

BACKGROUND OF THE INVENTION

1. Field of the Invention

The present invention relates to an image forming apparatus, a control method therefor, and a storage medium storing a control program therefor. Particularly, the present invention relates to a technique for improving efficiency of a print job executed by an image forming apparatus.

2. Description of the Related Art

A conventional image forming apparatus displays a sheet exchange request on an operation unit to prompt a user to change sheets when data will be printed on sheets that have different specification from sheets set in a feeder (a sheet cassette, a sheet tray, etc.). The user checks the sheet exchange request displayed on the operation unit, and prepares the sheets to be used. Then, the user takes out the remained sheets from the target feeder, and supplies the prepared sheets therein. Then, the user sets information about the supplied sheets through the operation unit. The user exchanges sheets and changes the sheet setting of the feeder according to such a procedure.

Japanese Laid-Open Patent Publication (Kokai) No. 2007-168383 (JP 2007-168383A) discloses a technique that compares sheets used in the already entered print job with sheets used in the following print job, and that displays a suitable exchange instruction when the already entered print job finishes.

Japanese Laid-Open Patent Publication (Kokai) No. 2000-238341 (JP 2000-238341A) discloses a function to execute automatic tone correction in order to stabilize image density characteristics.

Although the technique disclosed in JP 2007-168383A can display the suitable sheet-exchange instruction for the following print job when the current print job finishes, the user needs to change the sheet setting of the feeder in addition to exchange of the sheets. Accordingly, the stopping time of the image forming apparatus until execution of the following print job increases, which decreases productivity.

Moreover, although JP 2007-168383A suggests the method for changing the sheet setting after the image forming apparatus finishes the print job and stops, it does not suggest a method for setting the execution of the automatic tone correction beforehand.

SUMMARY OF THE INVENTION

The present invention provides an image forming apparatus, a control method therefor, and a storage medium storing a control program therefor, which are capable of decreasing the stopping time during which the image forming apparatus stops and of increasing productivity.

Accordingly, an aspect of the present invention provides an image forming apparatus comprising an image forming unit configured to execute a plurality of print jobs in order, an operation unit configured to receive an instruction inputted by a user, a generation unit configured to generate a setting job concerning a device setting based on a user's instruction inputted through the operation unit, a setting unit configured to set execution timing of the setting job generated by the generation unit based on a user's instruction inputted through the operation unit, and a control unit configured to stop an operation of the image forming unit and to execute the setting job generated by the generation unit at the execution timing set by the setting unit, and is configured to resume the operation of the image forming unit after the setting job finishes.

The present invention is capable of decreasing the stopping time during which the image forming apparatus stops and of maximizing productivity.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
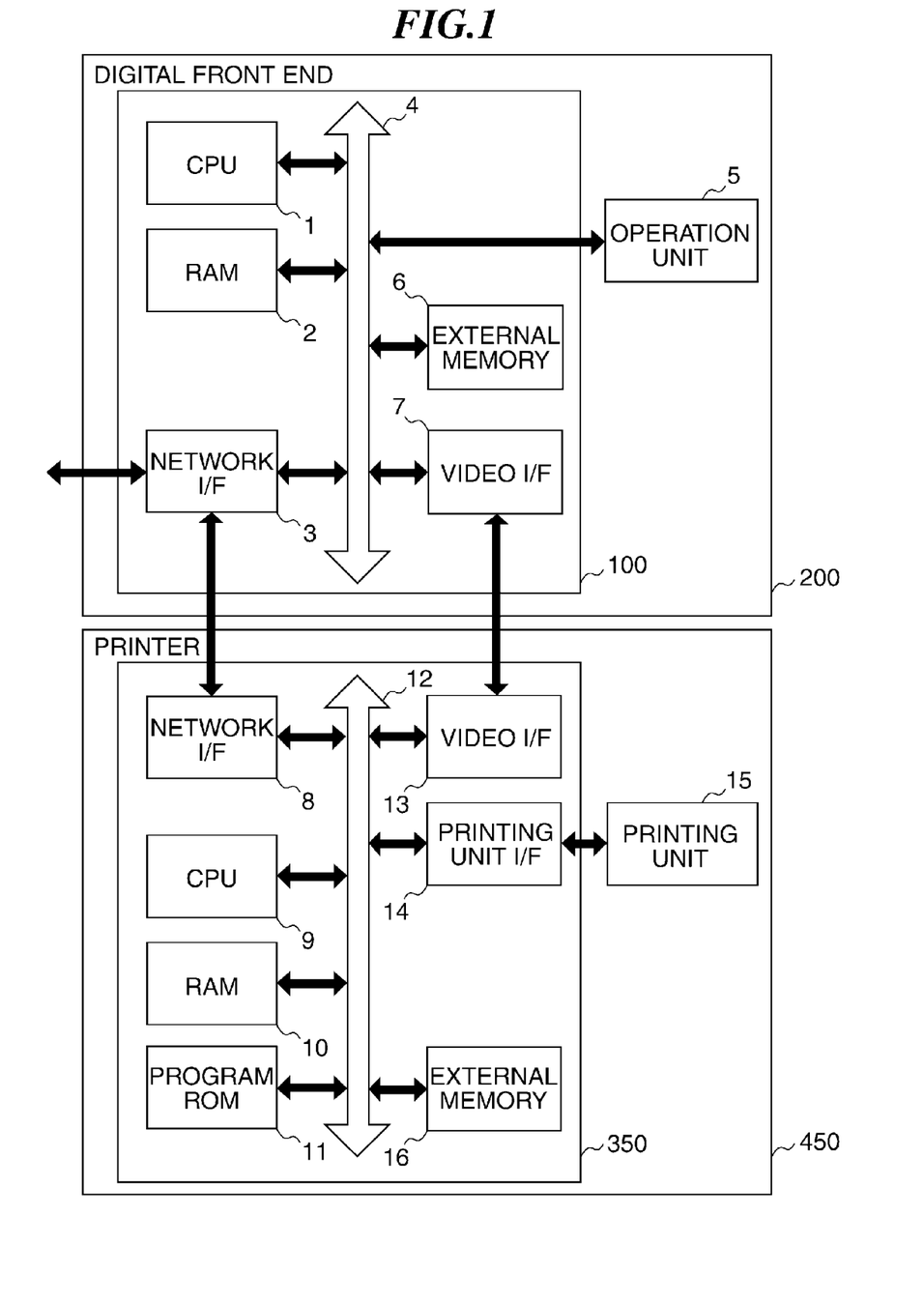
FIG. 1 is a block diagram schematically showing a configuration of an image forming apparatus according to an embodiment of the present invention.

FIG. 1 is a block diagram schematically showing a configuration of an image forming apparatus according to an embodiment of the present invention.

As shown in FIG. 1, the image forming apparatus consists of a digital front end 200 and a printer 450.

The digital front end 200 is provided with a main controller 100, and an operation unit 5 that displays information to a user and receives an input. The main controller 100 is provided with a CPU 1, a RAM 2, a network I/F 3, an external memory 6, a video I/F 7, and a system bus 4 that connects them mutually. The operation unit 5 is connected to the system bus 4.

The CPU 1 interprets a print job supplied via the network I/F 3 based on a program stored in the external memory 6, and controls collectively devices connected to the system bus 4. Moreover, the CPU 1 sets up print conditions, schedules print jobs, and sets up the apparatus according to user's instructions inputted through the operation unit 5. The external memory 6 is a hard disk drive (HDD) or the like and stores a control program that the CPU 1 executes. The RAM 2 functions as a main memory of the CPU 1 and as a work area.

The network I/F 3 functions as a print-job input unit that controls receipts of a print job and an instruction from an external device like a client on a network (not shown) and transmission of print data from the digital front end 200 to a client, for example. Moreover, the network I/F 3 is connected to an network I/F 8 in a printer controller 350 of the printer 450, and performs two-way communication for controlling the printer 450. The video I/F 7 is connected to a video I/F 13 in the printer controller 350 of the printer 450, and transmits the image data that is processed by the CPU 1 to the printer controller 350.

The printer 450 is provided with the printer controller 350 and a printing unit 15. The printer controller 350 is provided with the network I/F 8, a CPU 9, a RAM 10, a program ROM 11, the video I/F 13, a printing unit I/F 14, an external memory 16, and a system bus 12 that connects them mutually. The printing unit 15 is connected to the system bus 12 via the printing unit I/F 14.

The CPU 9 of the printer controller 350 outputs the image signal as output information to the printing unit 15 through the printing unit I/F 14 connected to the system bus 12 based on a control program. It should be noted that the control program is stored in the program ROM 11 and the external memory 16. The network I/F 8 receives a control instruction from the digital front end 200, and transmits the state of the printer 450. The video I/F 13 receives the image signal transmitted from the digital front end 200, and sends it to the printing unit 15 via the system bus 12 and the printing unit I/F 14.

Figure 2:
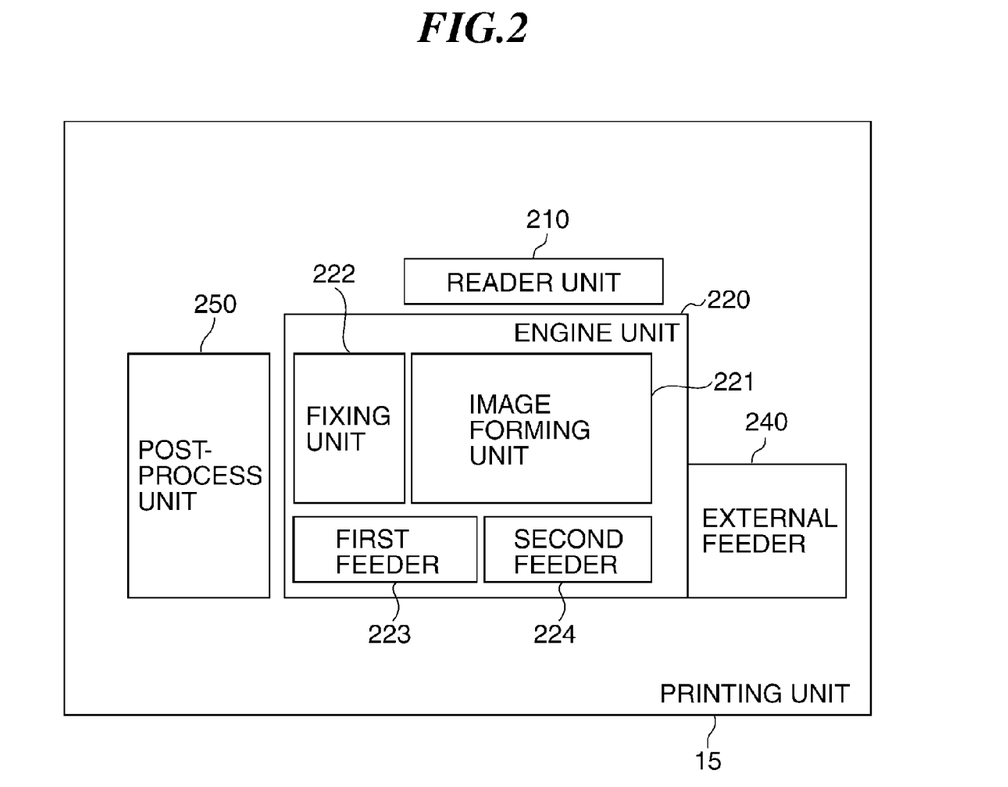
FIG. 2 is a view showing an internal configuration of a printing unit shown in FIG. 1.

FIG. 2 is a view showing an internal configuration of the printing unit 15 shown in FIG. 1.

The printing unit 15 is what is called a common print system, and consists of a reader unit 210, an engine unit 220, an external feeder 240, and a post-process unit 250.

The reader unit 210 has a function to read an image of an original. The external feeder 240 feeds a recording sheet to the engine unit 220. The post-process unit 250 performs a staple process, a bookbinding process, etc. to printed recording sheets that are ejected from the engine unit 220.

The engine unit 220 is a printing device that prints on a recording sheet, and is provided with an image forming unit 221, a fixing unit 222, a first feeder 223, and a second feeder 224.

In the engine unit, a recording sheet is usually fed to the image forming unit 221 from the first feeder 223, the second feeder 224, or the external feeder 240. Although the image forming apparatus in this embodiment is provided with three feeders, the number of feeders is not limited to this, and the apparatus may have two feeders or four or more feeders.

The image forming unit 221 forms an image on a recording sheet based on an image signal transmitted from the printer controller 350 via the printing unit I/F 14. Then, the fixing unit 222 fixes the image to the recording sheet, and the sheet is ejected to the post-process unit 250.

Figure 3A:
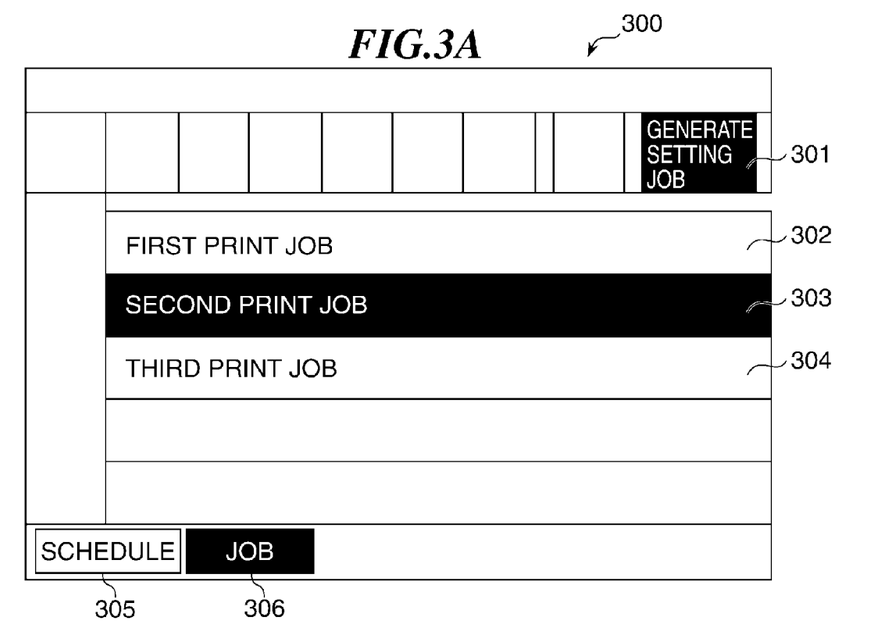
FIG. 3A is a view showing an example of a job control screen displayed on an operation unit shown in FIG. 1.
Figure 3B:
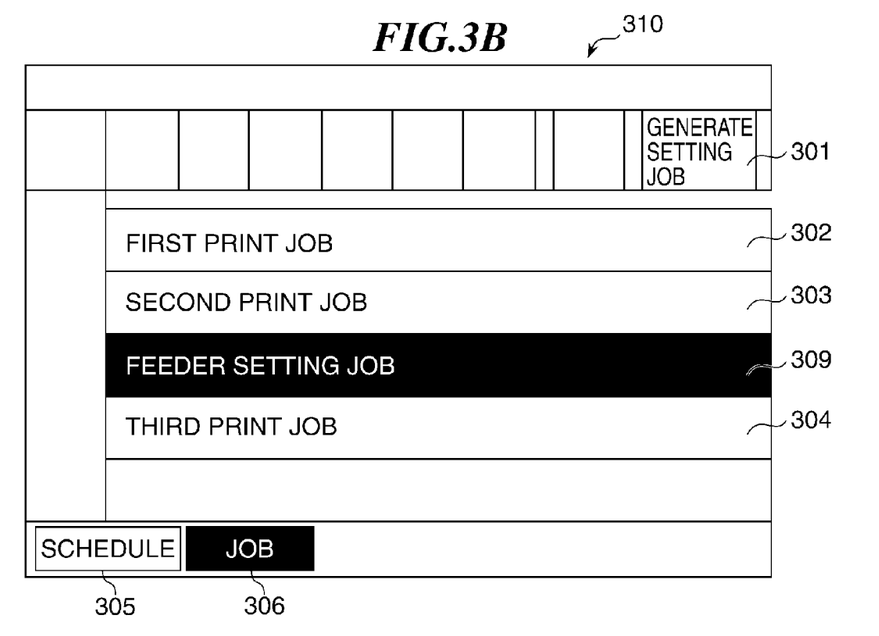
FIG. 3B is a view showing an example of the job control screen displayed on the operation unit shown in FIG. 1 when a feeder setting job is generated.

FIG. 3A and FIG. 3B are views showing examples of a job control screen displayed on the operation unit 5 in the digital front end 200.

The CPU 1 receives print data via the network I/F 3. Next, the CPU 1 analyzes the print data, and interprets a job attribute including sheet information (a size and type of sheet) that the print data uses. The CPU 1 displays the interpreted job attribute on the operation unit 5. Then, the CPU 1 converts the print data into image data.

In the examples shown in FIG. 3A and FIG. 3B, the CPU 1 receives first print data through the network I/F 3, interprets the job attribute, and displays a button 302 that designates a first print job. Similarly, the CPU 1 receives second print data and third print data, and displays a button 303 that designates a second print job and a button 304 that designates a third print job. These print jobs are due to be executed in the displayed order.

A schedule button 305 is used for changing to a schedule screen in which details of execution schedules of the print jobs displayed on the job control screen 300 are shown. When the schedule button 305 is pushed, the job control screen 300 is changed to the schedule screen.

A job button 306 is used for changing from the schedule screen to the job control screen. In the examples shown in FIG. 3A and FIG. 3B, the job button 306 is highlighted because the job control screen is displayed. When the job button 306 is pushed on the schedule screen, the schedule screen is changed to the job control screen 300.

A setting-job-generation button 301 is used for generating a feeder setting job. The feeder setting job performs a sheet setting for a feeder automatically. A user can set up the feeder setting job according to a method mentioned later. For example, in FIG. 3A, the button 303 that designates the second print job that will be executed just before the feeder setting job is selected and highlighted. When the feeder setting job is generated according to the method mentioned later, as shown in FIG. 3B, a button 309 that designates the feeder setting job is displayed just under the button 303 that designates the second print job.

Figure 4A:
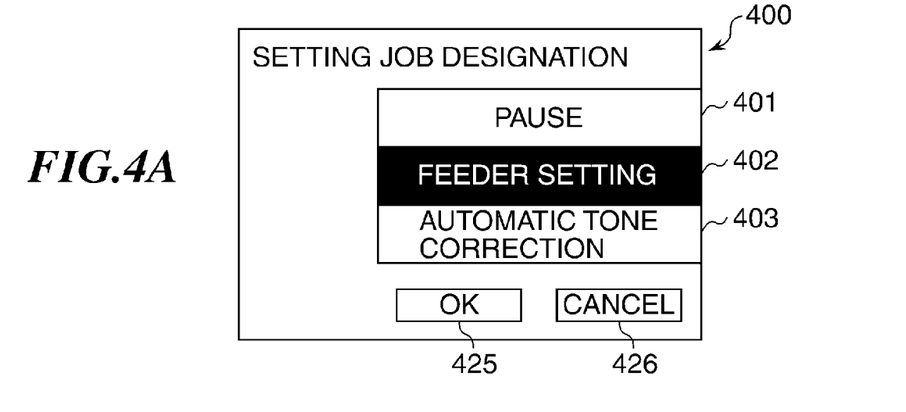
FIG. 4A is a view showing an example of the setting-job-designation screen displayed on the operation unit when a setting-job-generation button is pushed on the job control screen shown in FIG. 3A.

FIG. 4A is a view showing an example of a setting-job-designation screen 400 displayed on the operation unit 5 by the CPU 1 when the setting-job-generation button 301 is pushed on the job control screen 300 shown in FIG. 3A.

In the setting-job-designation screen 400, a user can select a kind of setting job that will be generated. In this embodiment, a pause button 401, a feeder setting button 402, or an automatic tone correction button 403 can be selected. For example, a push on the feeder setting button 402 will highlight the button concerned. When an OK button 425 is pushed in this state, a display is changed to a feeder designation screen 405 shown in FIG. 4B. When a cancel button 426 is pushed, a display returns to the job control screen 300.

Figure 4B:
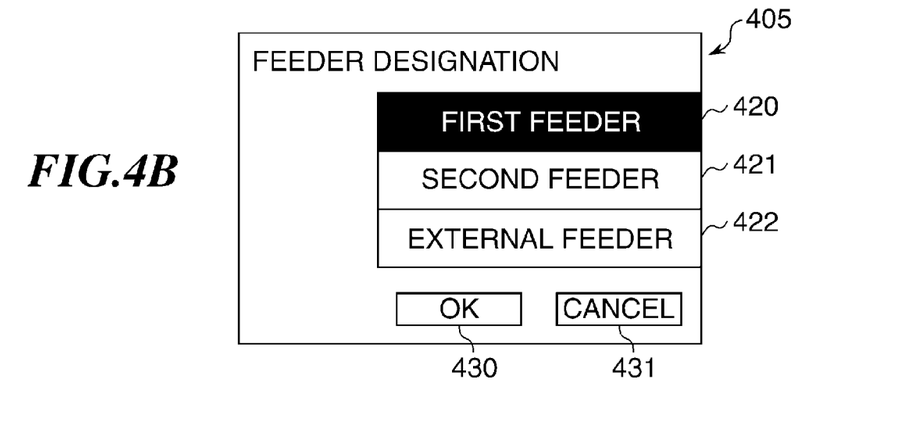
FIG. 4B is a view showing an example of a feeder designation screen displayed on the operation unit when a feeder setting button is pushed on the setting-job-designation screen shown in FIG. 4A.

FIG. 4B is a view showing an example of the feeder designation screen that the CPU 1 displays on the operation unit 5 when the feeder setting button 402 shown in FIG. 4A is pushed.

In the feeder designation screen 405, all the feeders that can be used by the image forming apparatus are displayed. In this embodiment, a button 420 that designates the first feeder 223, a button 421 that designates the second feeder 224, or a button 422 that designates the external feeder 240 can be selected. For example, a push on the button 420 that designates the first feeder 233 will highlight the button concerned. When an OK button 430 is pushed in this state, a display is changed to a sheet designation screen 406 shown in FIG. 4C. When a cancel button 431 is pushed, a display returns to the setting-job-designation screen 400.

Figure 4C:
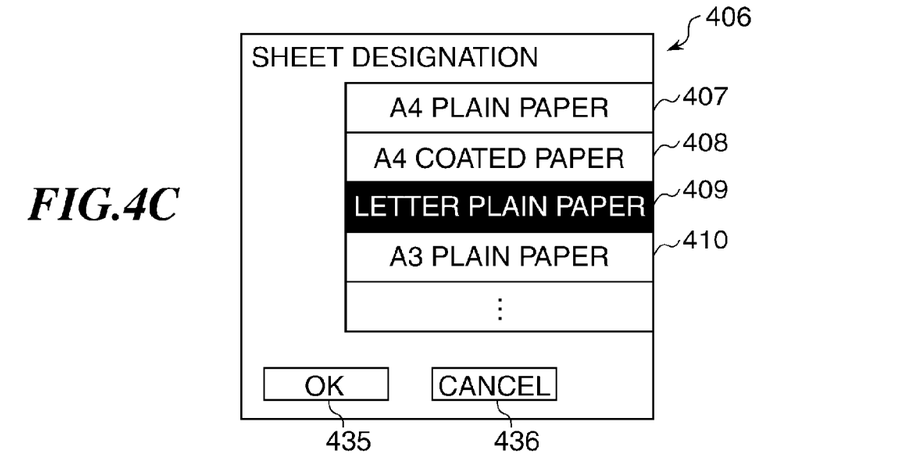
FIG. 4C is a view showing an example of a sheet designation screen displayed on the operation unit when a first-feeder button is pushed on the feeder designation screen shown in FIG. 4B.

FIG. 4C is a view showing an example of the sheet designation screen 406 that the CPU 1 displays on the operation unit 5 when the button 420 that designates the first feeder 223 shown in FIG. 4B is pushed.

In the sheet designation screen 406, sizes and types of sheets that can be stored into the selected feeder are displayed. In this embodiment, A4 plain paper (a button 407), A4 coated paper (a button 408), Letter plain paper (a button 409), and A3 plain paper (a button 410) can be selected. It should be noted that a size and type of a sheet is not limited to the illustrated examples. A scroll displaying is possible when items cannot be displayed within the display area. For example, a selection of the Letter plain paper (a push on the button 409) will highlight the button concerned. When an OK button 435 is pushed in this state, the sheet setting that the Letter plain paper is stored in the first feeder 223 is registered into the external memory 6, and a display is changed to the job control screen 300 shown in FIG. 3A. When a cancel button 436 is pushed, a display returns to the feeder designation screen 405 without registering a sheet setting. The CPU 1 determines what kind of sheet is stored in each feeder at the time of the schedule setting by executing the above-mentioned registration of the sheet setting for another feeder.

Next, the schedule screen that the CPU 1 displays on the operation unit 5 when the schedule button 305 is pushed on the job control screen 300 shown in FIG. 3A will be described.

Figure 5A:
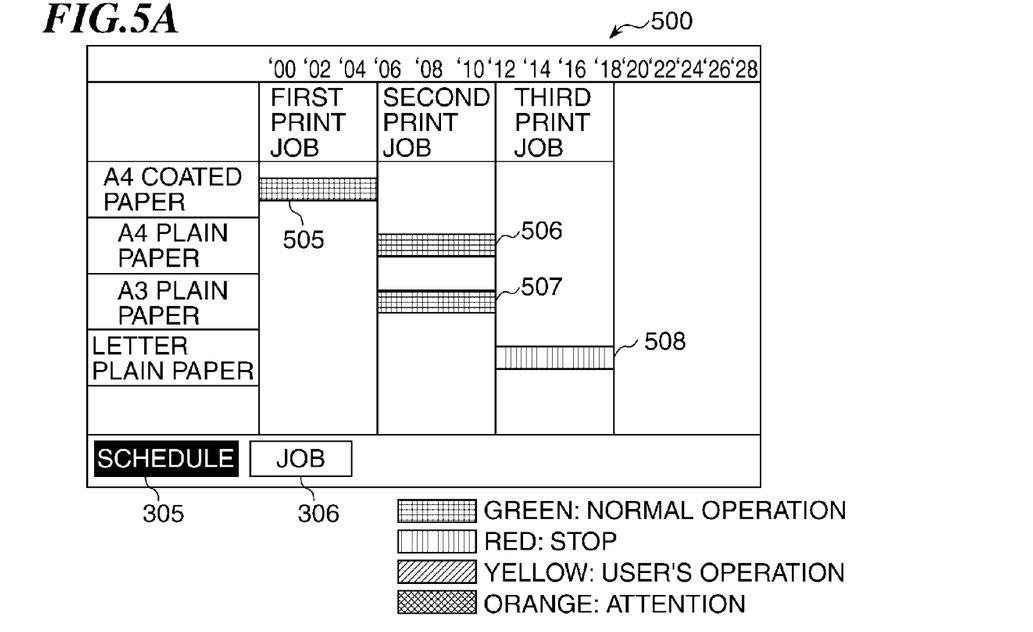
FIG. 5A is a view showing a first example of a schedule screen displayed on the operation unit when a schedule button is pushed on the job control screen shown in FIG. 3A.

FIG. 5A is a view showing a first example of the schedule screen that the CPU 1 displays on the operation unit 5 when the schedule button 305 is pushed on the job control screen 300. In this example, it shall be registered according to the registration of the sheet setting as mentioned above that A4 coated paper is stored in the first feeder 223, that A4 plain paper is stored in the second feeder 224, and that A3 plain paper is stored in the external feeder 240.

In the schedule screen 500, tags that indicate a first print job, a second print job, and a third print job are arranged in order along a time axis in a horizontal direction. On the other hand, sizes and types of sheets are listed in a longitudinal direction in the schedule screen 500. In this embodiment, the CPU 1 interprets the first print job and grasps that A4 coated paper is required and that printing time is about 5 minutes, for example. Then, the CPU 1 determines the kinds of sheets stored in the feeders by checking the registration information stored in the external memory 6. Then, the CPU 1 determines that A4 coated paper required for the first print job is stored in the first feeder 223, and displays a green bar 505 on the schedule screen 500. It should be noted that a green bar shows the state in which a print job can be executed normally.

Similarly, the CPU 1 interprets the second print job and grasps that A4 plain paper is required and that printing time is about 6 minutes. Moreover, since the required sheet is stored in the second feeder 224 and the external feeder 240, the CPU 1 displays green bars 506 and 507 on the schedule screen 500.

Next, the CPU 1 interprets the third print job and grasps that Letter plain paper is required and that printing time is about 7 minutes. However, since no feeder stores Letter plain paper, the CPU 1 determines that the third print job cannot be executed, and displays a red bar 508 on the schedule screen 500. It should be noted that a red bar shows the state in which an applicable print job cannot be executed and the image forming apparatus stops.

Figure 5B:
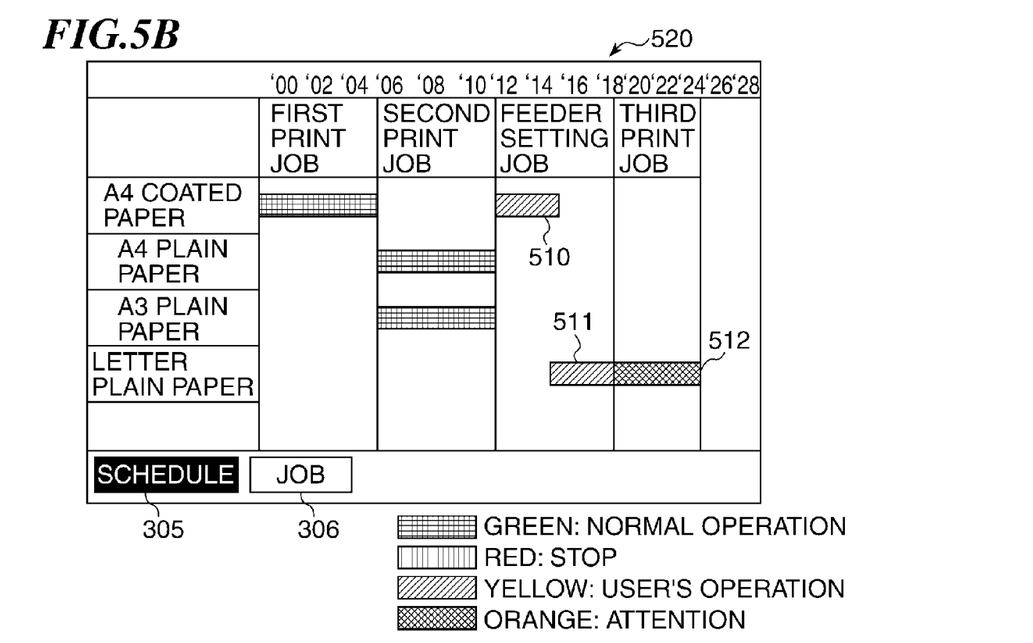
FIG. 5B is a view showing an example of a schedule screen displayed on the operation unit when the feeder setting job is generated in the schedule shown in FIG. 5A.

FIG. 5B is a view showing an example of the schedule screen that the CPU 1 displays on the operation unit 5 when the feeder setting job is generated by the method shown in FIG. 4A and FIG. 4B.

In the schedule screen 520, a feeder setting job is inserted between the second print job and the third print job. The feeder setting job exchanges the A4 coated paper stored in the first feeder 223 with Letter plain paper. Accordingly, the CPU 1 displays yellow bars 510 and 511 on the schedule screen 520. It should be noted that a yellow bar shows a user's operation.

An orange bar 512 displayed for Letter plain paper of the third print job shows that the image forming apparatus operates satisfactorily as long as the feeder setting job is performed correctly, and that the apparatus does not operate unless the feeder setting job is executed.

FIG. 5A and FIG. 5B describe the case where the sheet setting is performed by exchanging sheets in one feeder with sheets that are not stored in any of three feeders with which the printing unit 15 is provided.

On the other hand, since the number of sheets storable in a feeder is limited, an operation to supplement sheets to the feeder may be required when a plurality of print jobs that use the same kind of sheets are executed.

Accordingly, the schedule screen about the feeder setting job that supplements sheets will be described.

Figure 6A:
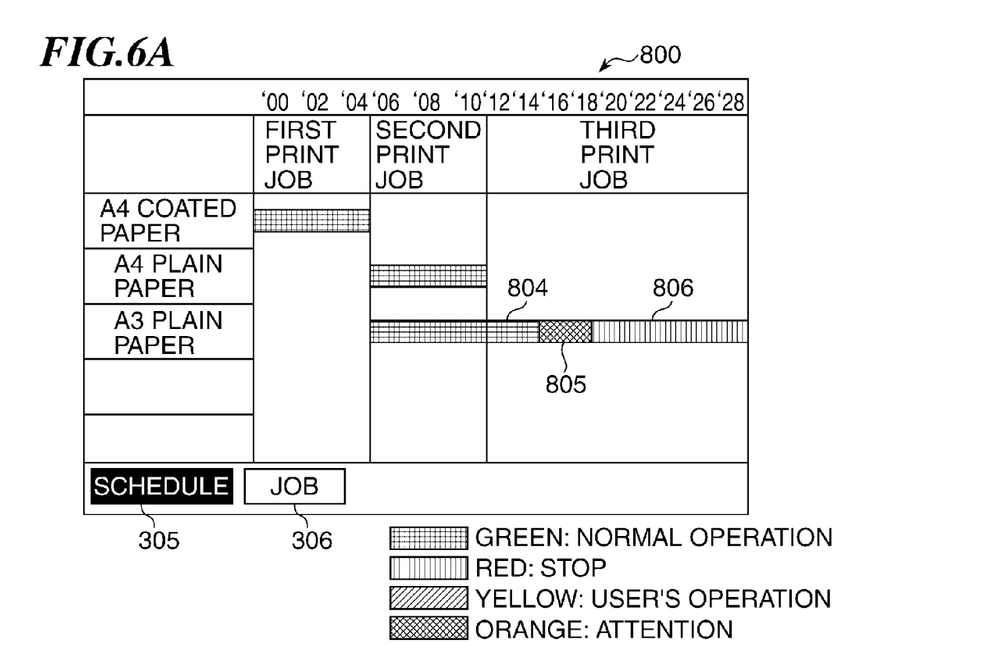
FIG. 6A is a view showing a second example of the schedule screen displayed on the operation unit when the schedule button is pushed on the job control screen shown in FIG. 3A.

FIG. 6A is a view showing a second example of the schedule screen that the CPU 1 displays on the operation unit 5 when the schedule button 305 is pushed on the job control screen 300. In this example, it shall be registered according to the registration of the sheet setting as mentioned above that A4 coated paper is stored in the first feeder 223, that A4 plain paper is stored in the second feeder 224, and that A3 plain paper is stored in the external feeder 240.

A first print job using A4 coated paper, a second print job using A4 plain paper, and a third print job using large amount of A3 plain paper are displayed in the schedule screen 800.

A green bar 804 is displayed for the third print job at the start of the job because sheets are stored in the feeder. As the print job proceeds, an orange bar 805, which shows that the residual sheets are few, is displayed. When the print job further proceeds and the feeder becomes empty, a red bar 806 is displayed and the job stops. Accordingly, a user generates the feeder setting job to supplement sheets and inserts it between the second print job and the third print job.

Figure 6B:
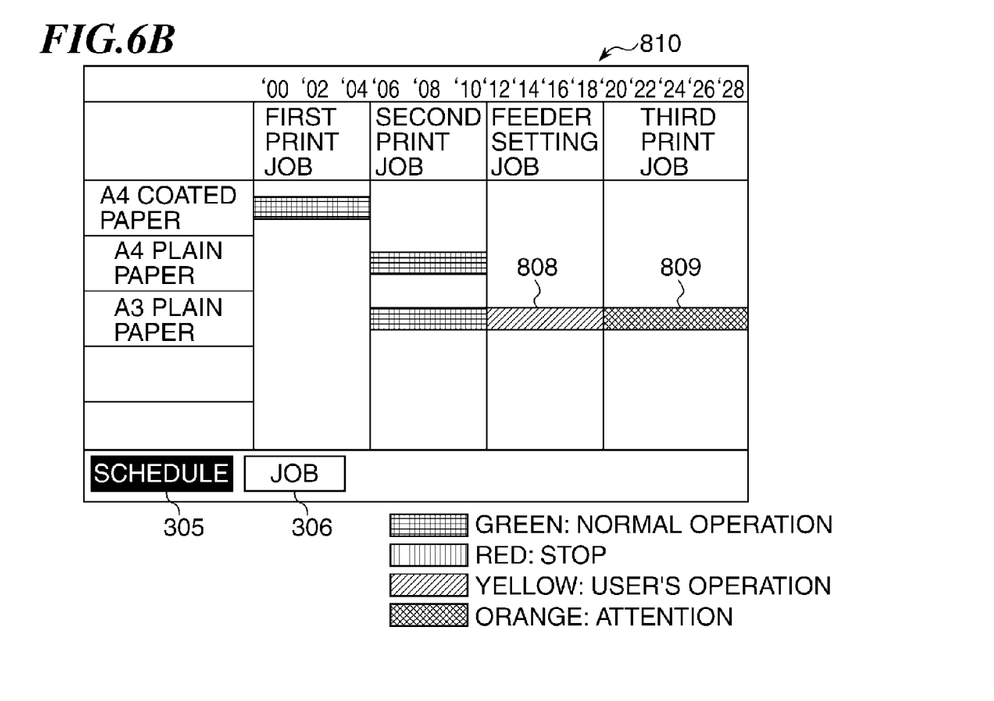
FIG. 6B is a view showing an example of the schedule screen displayed on the operation unit when the feeder setting job is generated in the schedule shown in FIG. 6A.

FIG. 6B is a view showing an example of the schedule screen that the CPU 1 displays on the operation unit 5 when the feeder setting job is generated.

In the schedule screen 810, the feeder setting job is inserted between the second print job and the third print job. Moreover, the feeder setting job and a yellow bar 808 are additionally displayed. The feeder setting job supplements A3 plain paper. Moreover, the bar for the third print job changes to an orange bar 809 as shown in FIG. 6B. It should be noted that a yellow bar shows that a user's operation is inserted.

Next, a feeder-setting-job-generation process executed by the digital front end 200 will be described using FIG. 7.

Figure 7:
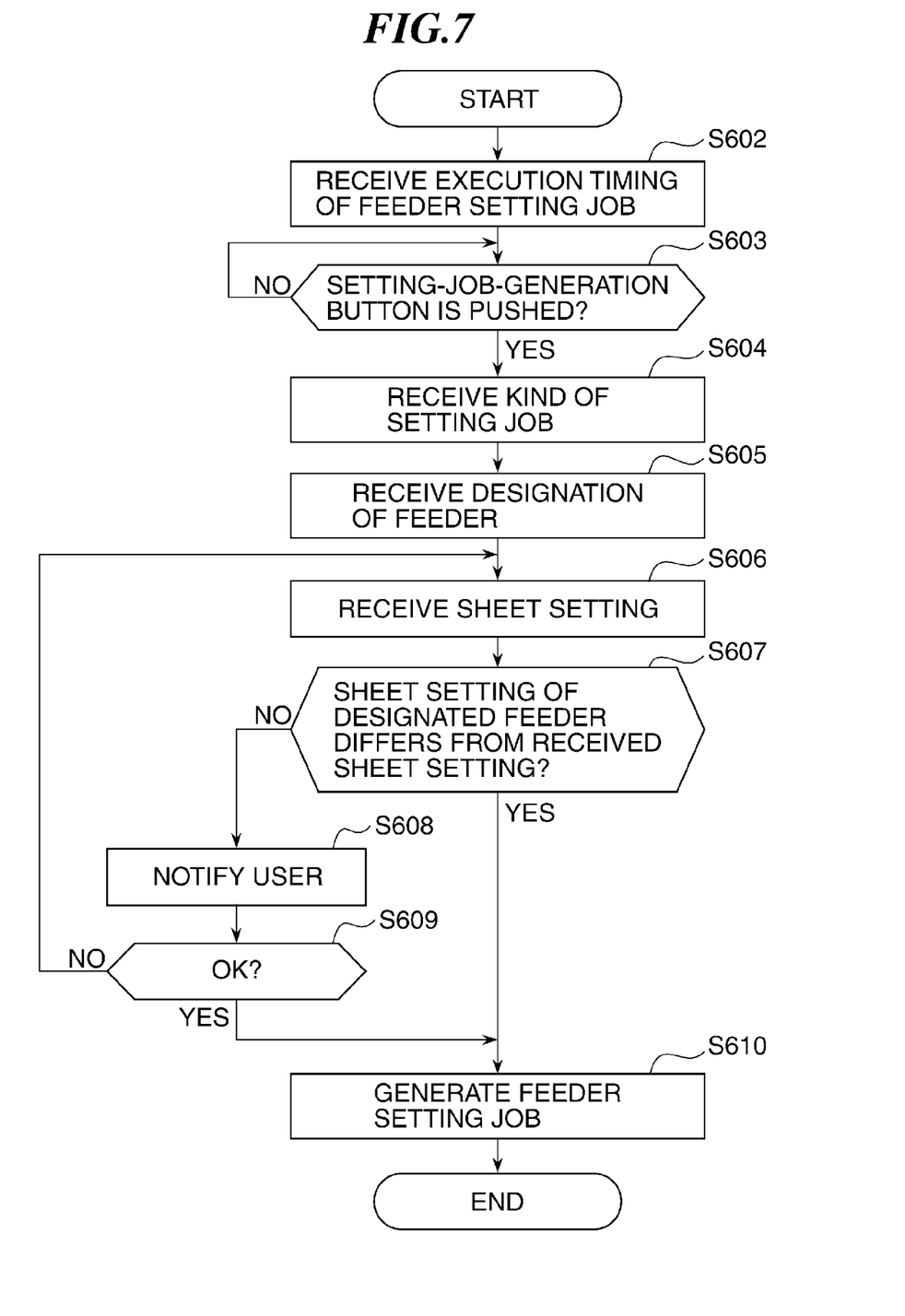
FIG. 7 is a flowchart shows a feeder-setting-job-generation process executed by a digital front end shown in FIG. 1.

FIG. 7 is a flowchart showing the feeder-setting-job-generation process executed by the digital front end 200 according to the first embodiment of the present invention. It should be noted that the program concerning this process is stored in the external memory 6 of the digital front end 200, is read to the RAM 2, and is executed by the CPU 1.

First, a case where a feeder setting job is accompanied by a sheet-exchange operation will be described.

The CPU 1 receives a selection of timing at which the feeder setting job is executed from a user on the job control screen 300 displayed on the operation unit 5 (step S602). In this embodiment, the selection of the second print job, which is executed just before executing the feeder setting job, shall be received. Thus, the image forming apparatus allows inserting a setting job between any print jobs.

Next, when a user pushes the setting-job-generation button 301 on the job control screen 300 (YES in the step S603), the process proceeds to step S604. In the step S604, the CPU 1 determines that a feeder-setting-job will be generated, displays the setting-job-designation screen 400 shown in FIG. 4A on the operation unit 5, and receives a selection about the kind of the setting job. In this embodiment, the user shall push the feeder setting button 402 on the setting-job-designation screen 400.

Next, the CPU 1 displays the feeder designation screen 405 shown in FIG. 4B on the operation unit 5, and receives a selection of the feeder of which the sheet setting will be changed (step S605). In this embodiment, the user shall select the button 420 that designates the first feeder 223 in which the A4 coated paper is stored.

Next, the CPU 1 displays the sheet designation screen 406 shown in FIG. 4C on the operation unit 5, and receives a selection of a sheet setting (a size and type of the sheet) in step S606. In this embodiment, the user shall select Letter plain paper (the button 409).

Next, the CPU 1 determines whether the current sheet setting of the first feeder 223 selected in the step S605 differs from the sheet setting that was newly selected by the user in the step S606 (step S607). When determining that the sheet settings are different, the CPU 1 generates a feeder setting job (step S610), and finishes this process. It should be noted that this process is finished without generating a feeder setting job when the user cancels, Moreover, the case where the CPU 1 determines that the sheet settings are not different in the step S607 will be described later.

After the above-mentioned process is completed, the CPU 1 additionally displays the feeder setting job and the yellow bars 510 and 511, and changes the red bar that was indicated for the third print job to the orange bar 512 like the schedule screen 520 shown in FIG. 5B. If the job button 306 is pushed on the schedule screen 520, the CPU 1 displays the job control screen 310 shown in FIG. 3B on the operation unit 5. In the job control screen 310, the feeder setting job is inserted between the second print job and the third print job.

Next, a case where a feeder setting job is accompanied by a sheet supplement operation will be described. It should be noted that the description about the steps S602, S603, and S604 is omitted because the procedures in these steps are the same as that in the above-mentioned case.

In step S605, the CPU 1 displays the feeder designation screen 405 shown in FIG. 4B on the operation unit 5, and receives a selection of the feeder to which sheets will be supplemented. In this embodiment, the user shall push the button 422 that designates the external feeder 240 in which the A4 coated paper is stored.

Next, the CPU 1 displays the sheet designation screen 406 shown in FIG. 4C on the operation unit 5, and receives a selection of a size and type of the sheet (step S606). In this embodiment, the user shall select A3 plain paper (the button 410).

Figure 9:
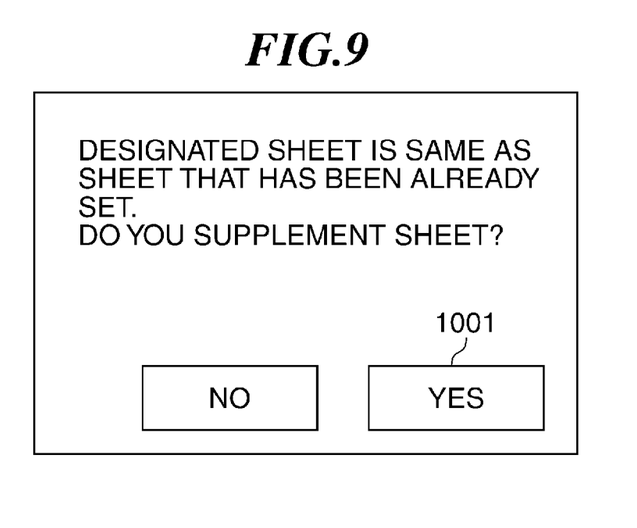
FIG. 9 is a view showing an example of a notification screen displayed on the operation unit in step S608 in FIG. 7.

Next, the CPU 1 determines whether the current sheet setting of the external feeder 240 selected in the step S605 differs from the sheet setting that was selected by the user in the step S606 (step S607). In this embodiment, since the same A3 plain paper is selected to supplement the sheets, the CPU 1 displays a screen shown in FIG. 9 on the operation unit 5 to notify the user (step S608). If an "YES" button 1001 that means to supplement the sheets is selected on the screen shown in FIG. 9 (YES in the step S609), the CPU 1 generates a feeder setting job (step S610), and finishes this process.

After the above-mentioned process is completed, the CPU 1 changes the schedule screen 800 displayed on the operation unit 5 to the schedule screen 810 shown in FIG. 6B.

Next, an execution process for the set-up feeder setting job 309 will be described using FIG. 8.

Figure 8:
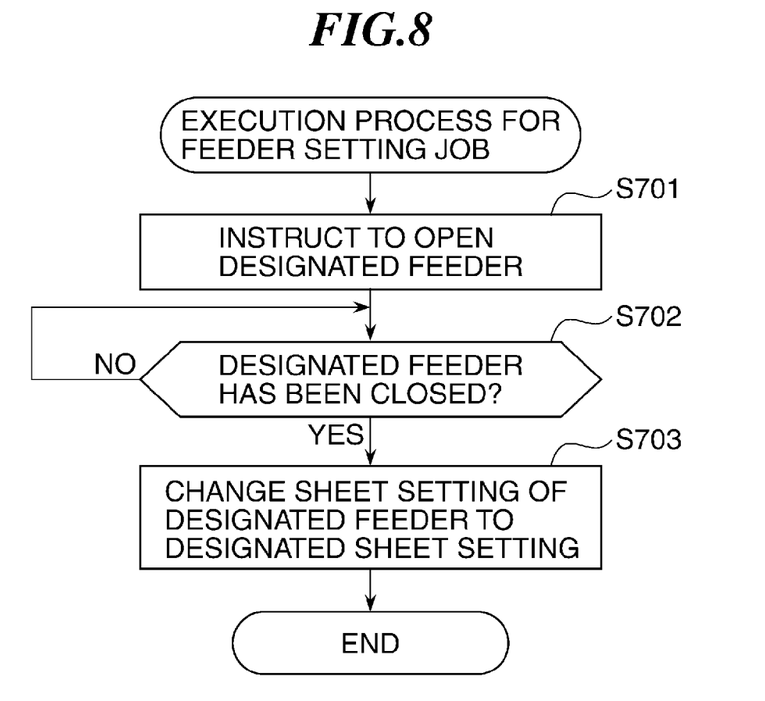
FIG. 8 is a flowchart showing an execution process for the feeder setting job executed by the digital front end shown in FIG. 1.

FIG. 8 is a flowchart showing an execution process for the feeder setting job.

When the feeder setting job started after finishing the first print job and the second print job, the CPU 1 instructs the printer 450 to open the first feeder 223 of the printing unit 15 through the network I/F 3 (step S701). It should be noted that the CPU 1 instructs the printer 450 to open the external feeder 240 when the feeder setting job is to supplement sheets.

The user exchanges the sheets in the opened feeder according to the sheet setting displayed on the operation unit 5. The sheet setting displayed on the operation unit 5 indicates the sheet set up on the sheet designation screen 406 in the step S606 in FIG. 7. When the feeder setting job is to exchange the sheets (FIG. 5B), the user exchanges the A4 coated paper with the Letter plain paper. When the feeder setting job is to supplement the sheets (FIG. 6B), the user supplements the A3 plain paper.

After the sheet exchange (or sheet supplement) is completed, the user closes the feeder. When the feeder has been closed, the printing unit 15 notifies the CPU 1 of the digital front end 200 that the feeder has been closed via the network I/F 8. When receiving the notice that the feeder has been closed, the CPU 1 changes the sheet setting of the feeder to the sheet setting (a post-exchange sheet setting in the case of sheet exchange) set up on the sheet designation screen 406 (step S703). It should be noted that the CPU 1 determines whether the feeder opens or closes based on the information acquired from a detection sensor (not shown).

This embodiment decreases the stopping time of the image forming apparatus and increases productivity without performing a setting operation after the image forming apparatus stops, when the sheet setting for the feeder is performed between any print jobs.

Next, a case where the automatic tone correction button 403 is pushed on the setting-job-designation screen 400 shown in FIG. 4A will be described.

Figure 10A:
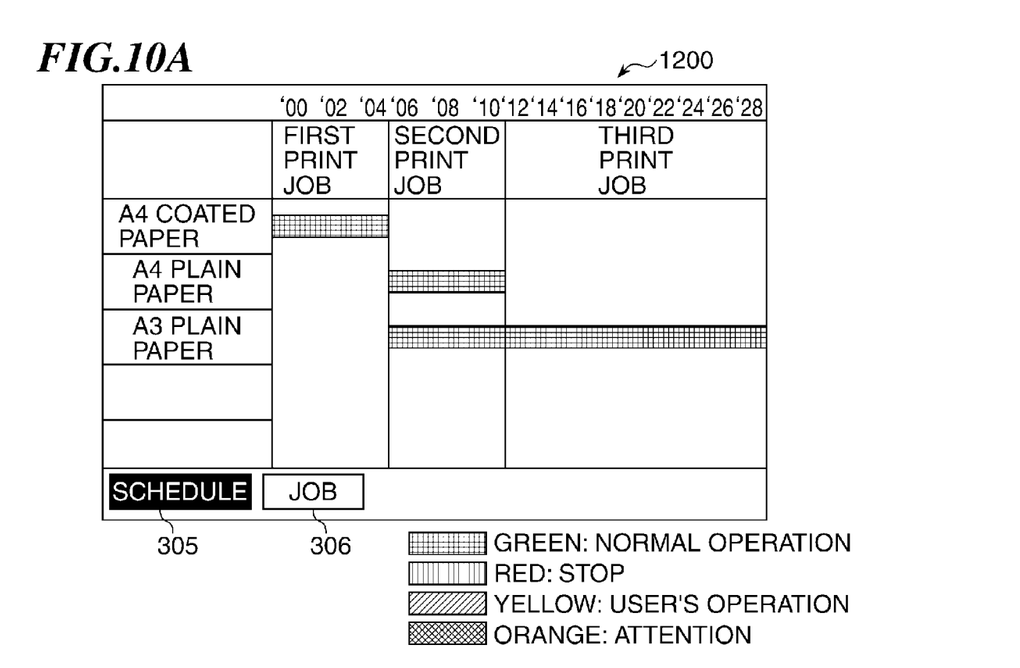
FIG. 10A is a view showing an example of a schedule screen displayed on the operation unit when an automatic tone correction button is pushed on the setting-job-designation screen shown in FIG. 4A.
Figure 10B:
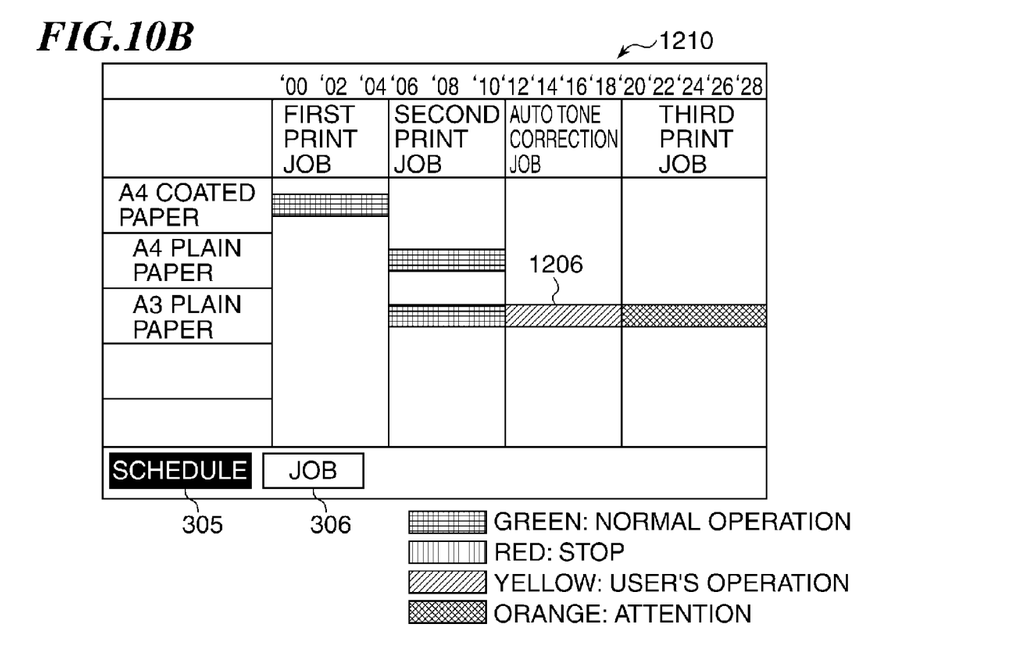
FIG. 10B is a view showing an example of a schedule screen displayed on the operation unit when an automatic tone correction job is generated.

FIG. 10A is a view showing an example of the schedule screen that the CPU 1 displays on the operation unit 5 when the automatic tone correction button 403 is pushed on the setting-job-designation screen 400. FIG. 10B is a view showing an example of the schedule screen that the CPU 1 displays on the operation unit 5 when the automatic tone correction job is generated.

A first print job using A4 coated paper, a second print job using A4 plain paper and A3 plain paper, and a third print job using large amount of A3 plain paper are displayed in the schedule screen 1200. In such a case, it is necessary to execute the automatic tone correction to increase color stability just before the third print job.

Figure 11:
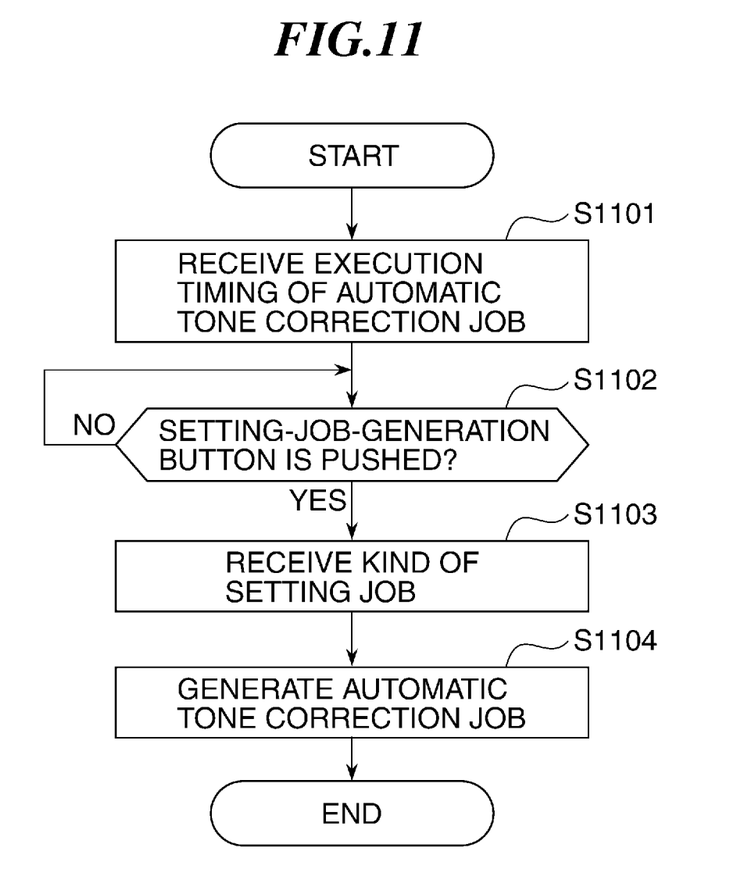
FIG. 11 is a flowchart showing an automatic-tone-correction-job-generation process executed by the digital front end shown in FIG. 1.

FIG. 11 is a flowchart showing a feeder-setting-job-generation process executed by the digital front end 200 according to the second embodiment of the present invention. It should be noted that the program concerning this flowchart is stored in the external memory 6 of the digital front end 200, is read to the RAM 2, and is executed by the CPU 1.

The CPU 1 receives a selection of timing at which the automatic tone correction job is executed from a user on the job control screen 300 displayed on the operation unit 5 (step S1101). In this embodiment, the selection of the second print job, which is executed just before executing the automatic tone correction job, shall be received.

Next, when a user pushes the setting-job-generation button 301 on the job control screen 300 (YES in the step S1102), the process proceeds to step S1103. In the step S1103, the CPU 1 displays the setting-job-designation screen 400 shown in FIG. 4A on the operation unit 5, and receives a selection about the kind of the setting job. In this embodiment, the user selects the automatic tone correction button 403 on the job-designation screen 400.

Next, the CPU 1 generates the automatic tone correction job (step S1104), and finishes this process.

After the above-mentioned process is completed, the CPU 1 changes the schedule screen 1200 displayed on the operation unit 5 to the schedule screen 1210 shown in FIG. 10B. In the schedule screen 1210, the automatic tone correction job and a yellow bar 1206 are additionally displayed. Thereby, the automatic tone correction job is inserted immediately after the second print job, and the automatic tone correction can be executed just before the third print job.

This embodiment decreases the stopping time of the image forming apparatus and increases productivity without performing a setting operation after the image forming apparatus stops, when the automatic tone correction is performed between any print jobs.

Although the above-mentioned embodiments described the cases where the feeder setting job and the automatic tone correction job were inserted, any device setting job, such as a change of device configuration and a setting about the entire device, may be inserted as long as it is not accompanied by a print job. Moreover, since a setting job can be registered, the setting job can be moved to an interval between other jobs. Moreover, a setting job may be executed between any copies or any pages of any print job.

Furthermore, a setting job, such as a feeder setting job or an automatic tone correction job may be registered in association with a print job. In such a case, the print job that is associated with the setting job may be moved according to the change of execution timing of the setting job.

Moreover, the above-mentioned embodiments described the cases where the image forming apparatus generates the feeder setting job and the automatic tone correction job. However, such a job may be generated by an external device like a client PC and executed by the image forming apparatus, for example.

Moreover, although the user creates a setting job in the above-mentioned embodiment, a setting job may be automatically created based on print jobs before and after the setting job.

Although the above-mentioned embodiments described the case where the present invention was applied to the image forming apparatus, the present invention can be applied to a single-unit device and a system consisting of devices as long as the function of the present invention can be executed therein. Moreover, the present invention is applicable to a system that performs processes among devices connected through networks, such as a LAN and WAN, as long as the function of the present invention can be executed therein.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-130664, filed on Jun. 8, 2012, which is hereby incorporated by reference herein in its entirety.

What is claimed is:

1. An image forming apparatus comprising:

a non-transitory memory device;

a processor configured to execute computer executable instructions recorded on the non-transitory memory device, the computer executable instructions including instructions, that when executed by the processor, cause the image forming apparatus to:

generate a changing job to change sheet information set on a sheet cassette, wherein in the generated changing job, a targeted sheet cassette, of which the set sheet information is to be changed, and sheet information to be newly set after the change are designated;

set a timing of executing the changing job based on a designation of a user;

execute the changing job at the set timing;

open the targeted sheet cassette designated in the changing job; and change, when it is detected that the opened targeted sheet cassette is closed, the sheet information set on the targeted sheet cassette to the to-be-newly-set sheet information designated in the changing job.

2. The image forming apparatus according to claim 1, wherein the image forming apparatus is caused to set the timing of executing the changing job such that the changing job is executed after a specified print job.

3. The image forming apparatus according to claim 1, wherein the image forming apparatus is caused to set the timing of executing the changing job such that the changing job is executed before a specified print job.

4. The image forming apparatus according to claim 1, wherein the computer executable instructions further include instructions, that when executed by the processor, cause the image forming apparatus to:

receive, from a user, designation of a targeted sheet cassette, of which sheet information set thereon is to be changed, and designation of sheet information to be newly set after the change; and determine whether or not sheet information currently set on the targeted sheet cassette and the sheet information to be newly set after the change are different from each other, wherein in a case where it is determined that the sheet information currently set on the targeted sheet cassette and the sheet information to be newly set after the change are different from each other, the changing job is generated.

5. A control method for an image forming apparatus, the control method comprising:

generating a changing job to change sheet information set on a sheet cassette, wherein in the generated changing job, a targeted sheet cassette, of which the set sheet information is to be changed, and sheet information to be newly set after the change are designated;

setting a timing of executing the changing job based on a designation of a user; and executing the changing job at the set timing, wherein executing the changing job includes opening the targeted sheet cassette designated in the changing job and changing, when it is detected that the opened targeted sheet cassette is closed, the sheet information set on the targeted sheet cassette to the to-be-newly-set sheet information designated in the changing job.

6. A non-transitory computer-readable storage medium storing a control program causing a computer to execute a control method for an image forming apparatus, the control method comprising:

generating a changing job to change sheet information set on a sheet cassette, wherein in the generated changing job, a targeted sheet cassette, of which the set sheet information is to be changed, and sheet information to be newly set after the change are designated;

setting a timing of executing the changing job based on a designation of a user; and executing the changing job at the set timing, wherein executing the changing job includes opening the targeted sheet cassette designated in the changing job and changing, when it is detected that the opened targeted sheet cassette is closed, the sheet information set on the targeted sheet cassette to the to-be-newly-set sheet information designated in the changing job.

* * * * *